US00RE47572E

(19) United States
(12) Reissued Patent
Sewell et al.

(10) Patent Number: US RE47,572 E
(45) Date of Reissued Patent: Aug. 20, 2019

(54) SPROCKET WITH DOUBLE MUD RELIEF

(71) Applicant: The Charles Machine Works, Inc., Perry, OK (US)

(72) Inventors: Cody L. Sewell, Perry, OK (US); Brant D. Kukuk, Perry, OK (US)

(73) Assignee: The Charles Machine Works, Inc., Perry, OK (US)

(21) Appl. No.: 29/655,614

(22) Filed: Jul. 5, 2018

Related U.S. Patent Documents

Reissue of:
(64) Patent No.: Des. 794,690
Issued: Aug. 15, 2017
Appl. No.: 29/554,286
Filed: Feb. 10, 2016

(51) LOC (12) Cl. ..... 15-09
(52) U.S. Cl.
USPC ..... D15/148
(58) Field of Classification Search
USPC ..... D12/80, 123; D15/148, 149; 74/640; 192/38; 475/331
See application file for complete search history.

(56) References Cited

U.S. PATENT DOCUMENTS 6,142,900 A * 11/2000 Takamori ..... B21H 5/02 474/152
6,415,532 B1 7/2002 Bricko et al. ..... E02F 3/143 37/352
6,910,980 B2 * 6/2005 Hamilton ..... F16H 55/06 474/156
D527,245 S * 8/2006 Kelleghan ..... D8/356
7,416,500 B2 * 8/2008 Young ..... F16H 7/06 474/152
7,451,863 B2 * 11/2008 Chen ..... F16D 41/30 192/46
7,914,408 B2 * 3/2011 Young ..... F16H 7/06 474/152
8,202,185 B2 * 6/2012 Haesloop ..... F16H 55/30 474/156
D716,191 S * 10/2014 Reiter ..... F16H 55/303 D12/123
D751,036 S * 3/2016 Svensson ..... D13/112
D781,345 S * 3/2017 Pratley ..... D15/5
2012/0198950 A1 * 8/2012 Pietrala ..... E21C 29/02 74/89.17
2017/0074383 A1 * 3/2017 Sewell ..... E02F 5/06

OTHER PUBLICATIONS

The Charles Machine Works, Inc. "Hard-Working Parts for Hard-Working Pros.", company catalog, 2016, thirty-nine pages, Perry, Oklahoma.

* cited by examiner

*Primary Examiner* — Philip S Hyder
(74) *Attorney, Agent, or Firm* — Tomlinson McKinstry, P.C.

(57) CLAIM

The ornamental design for a sprocket with double mud relief, as shown and described.

DESCRIPTION

FIG. 1 is a front view of a sprocket with double mud relief showing our new design;
FIG. 2 is an edge view of the sprocket shown in FIG. 1;
FIG. 3 is a front top left perspective view of the sprocket shown in FIG. 1; and,
FIG. 4 is a second front top left perspective view at a different angle than the view of FIG. 3.
The broken lines indicate unclaimed portions and form no part of the claimed design.

1 Claim, 7 Drawing Sheets

Figure 1:
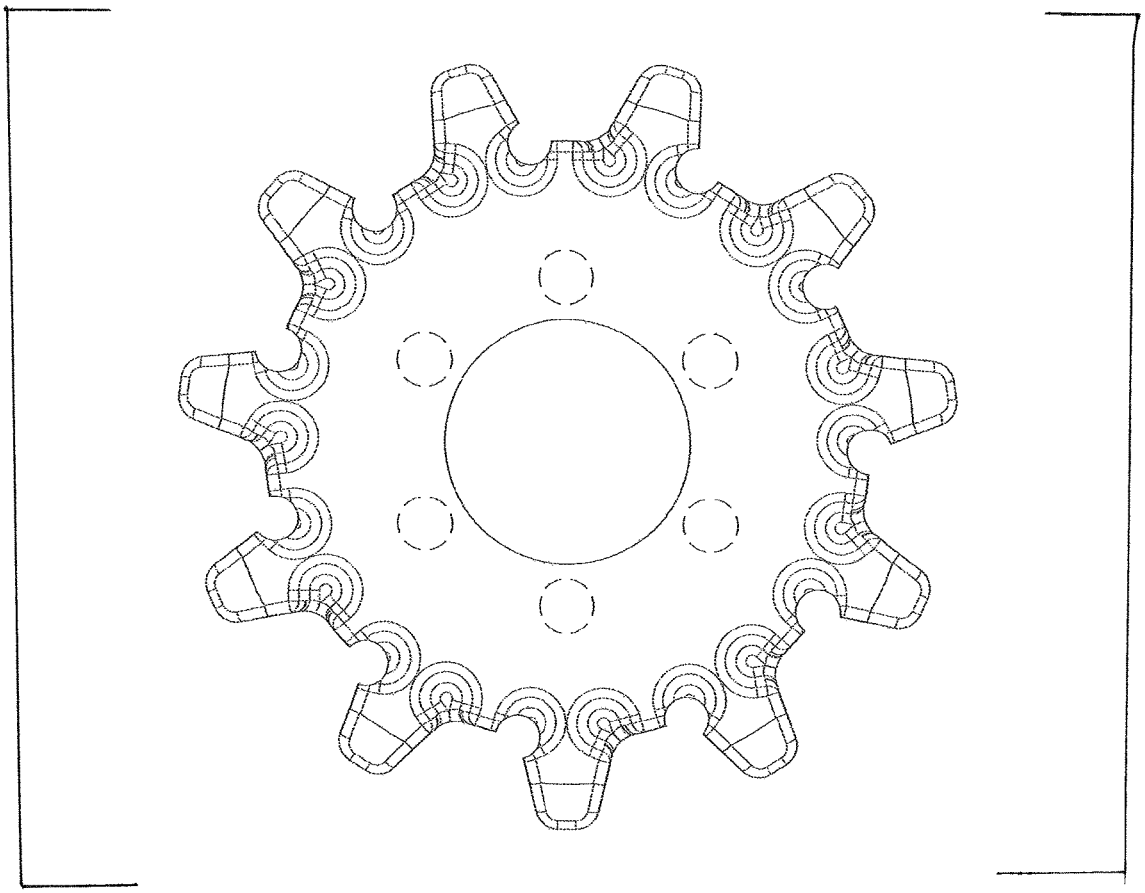
Figure 1:
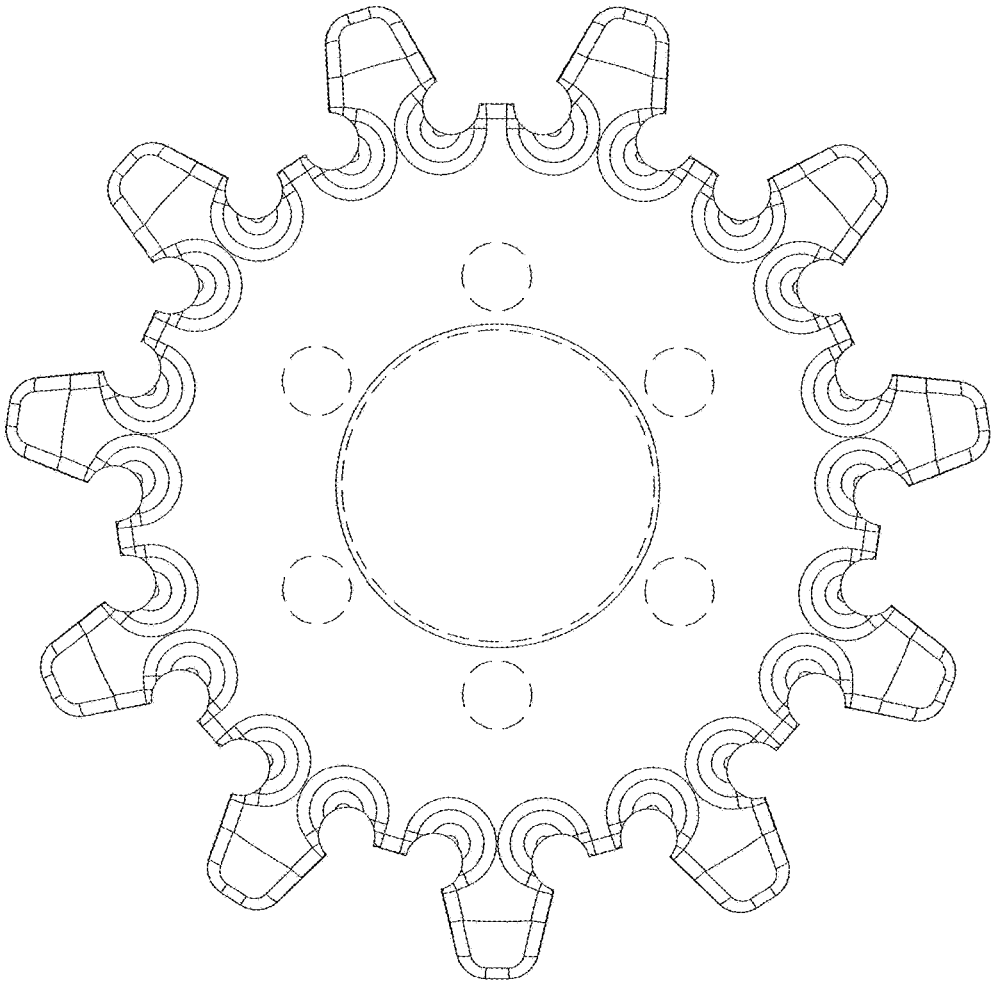
Figure 2:
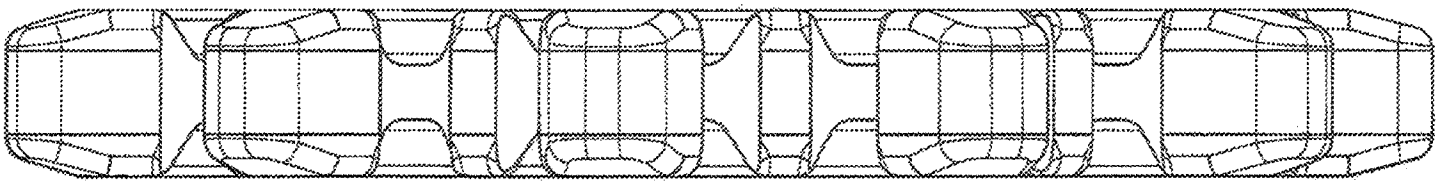
Figure 3:
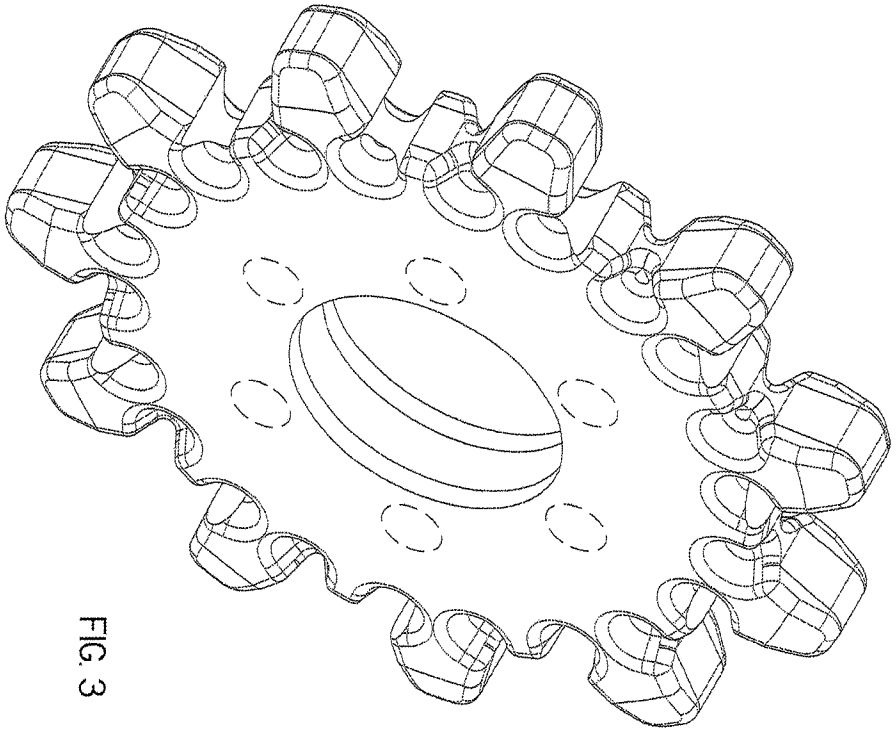
Figure 3:
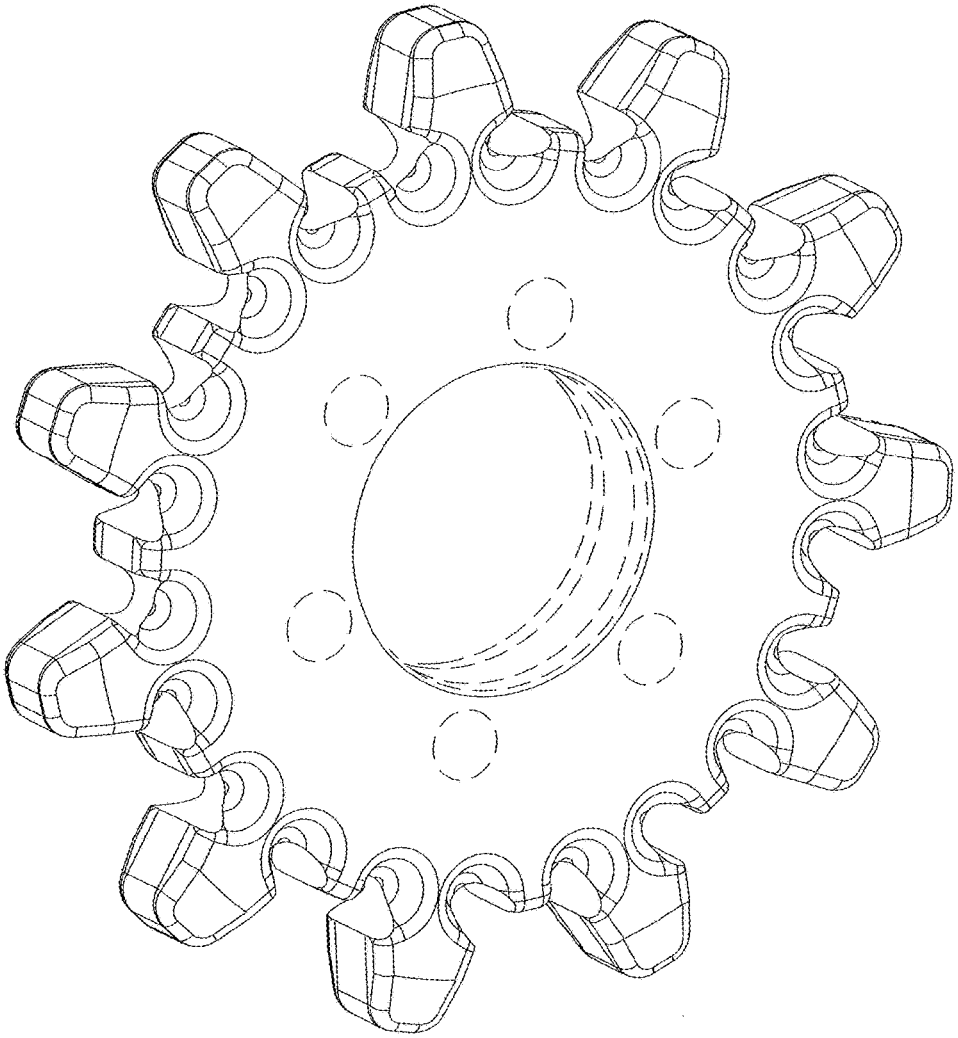
Figure 4:
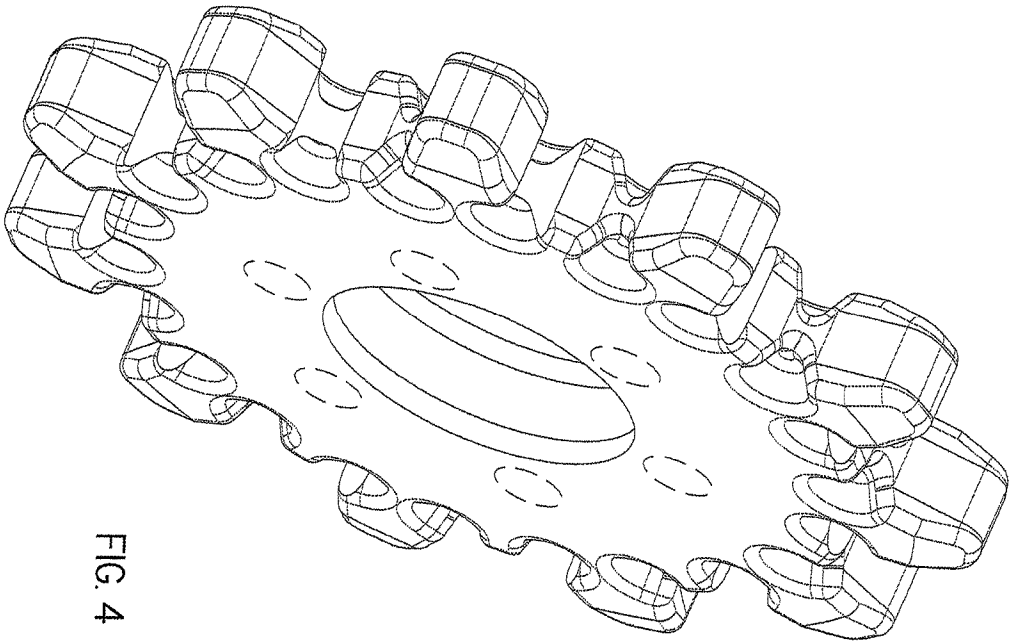
Figure 4:
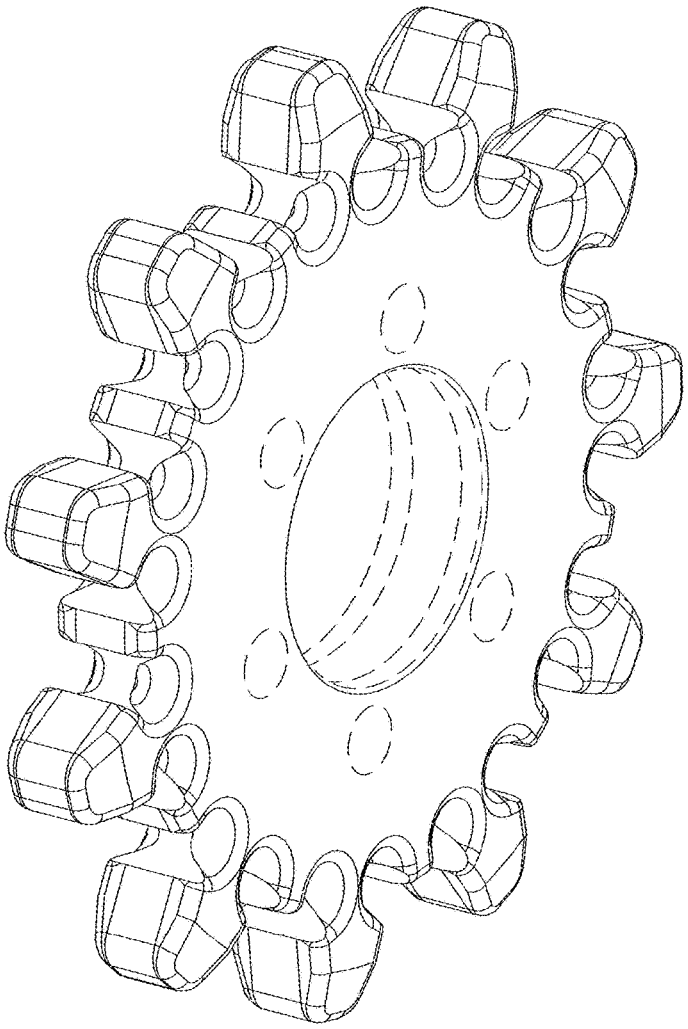

Matter enclosed in heavy brackets [ ] appears in the original patent but forms no part of this reissue; matter printed in italics indicates the additions made by reissue.

Canceled

Amended

Canceled

Amended

Canceled

Amended

Canceled

Amended